US012709082B2

(12) United States Patent
Kohler

(10) Patent No.: US 12,709,082 B2
(45) **Date of Patent: *Aug. 18, 2026**

(54) WARP DETECTION IN TRAVELING CORRUGATED PRODUCT

(71) Applicant: INTPRO, LLC, Uniontown, OH (US)

(72) Inventor: Herbert B. Kohler, Uniontown, OH (US)

(73) Assignee: INTPRO, LLC

( * ) Notice: Subject to any disclaimer, the term of this patent is extended or adjusted under 35 U.S.C. 154(b) by 0 days.

This patent is subject to a terminal disclaimer.

(21) Appl. No.: 19/195,960

(22) Filed: May 1, 2025

(65) Prior Publication Data

US 2025/0256479 A1 Aug. 14, 2025

Related U.S. Application Data

(63) Continuation of application No. 18/367,558, filed on Sep. 13, 2023, now Pat. No. 12,311,632.

(60) Provisional application No. 63/406,433, filed on Sep. 14, 2022.

(51) Int. Cl.
*B65G 53/00* (2006.01)
*B31F 1/28* (2006.01)
*G01B 11/24* (2006.01)

(52) U.S. Cl.
CPC .............. *B31F 1/284* (2013.01); *G01B 11/24* (2013.01)

(58) Field of Classification Search
CPC .......... G01B 11/24; G01G 5/00; B65G 53/00; B31F 1/284; B31F 1/28
See application file for complete search history.

(56) References Cited

U.S. PATENT DOCUMENTS 3,826,178 A * 7/1974 Taylor ..................... B31F 1/284 162/197
4,202,723 A * 5/1980 Chaudhuri ............ B31F 1/2845 156/555
4,616,960 A * 10/1986 Gladish .................. B65G 51/03 52/505
4,805,626 A * 2/1989 DiMassimo ........... A61B 5/055 5/81.1 R
5,090,330 A * 2/1992 Gladish .................. B65G 51/03 406/88
5,632,830 A * 5/1997 Marschke ........... B32B 37/1027 156/359
5,788,803 A * 8/1998 Sissons ................... B31F 1/284 156/499
5,837,974 A * 11/1998 Sissons ................... B31F 1/284 156/359
6,630,633 B1 * 10/2003 Uber ...................... G01G 5/006 209/639
7,993,081 B2 * 8/2011 Iida ................... H01L 21/67784 414/676
9,169,086 B1 * 10/2015 Burchell .............. B65G 51/035
10,655,950 B2 * 5/2020 Ruhland ............ G01B 11/0691
10,858,202 B1 * 12/2020 McNamara .......... B65G 1/1375
11,375,124 B2 * 6/2022 Wang ..................... H04N 23/54
(Continued)

*Primary Examiner* — Gloria R Weeks
(74) *Attorney, Agent, or Firm* — Tucker Ellis LLP

(57) ABSTRACT

An apparatus for use in producing a multi-layer product includes a flotation column for supporting the multi-layer product at a variable height above the flotation column on a cushion of air. The apparatus further includes a warp detection apparatus for detecting an amount of warp in the multi-layer product supported by the flotation column.

20 Claims, 5 Drawing Sheets

(56) References Cited

U.S. PATENT DOCUMENTS

| | | | | |
|---|---|---|---|---|
| 2005/0284579 | A1* | 12/2005 | Ishibuchi | B31F 1/284 156/367 |
| 2008/0077267 | A1* | 3/2008 | Ishibuchi | B31F 1/284 700/89 |
| 2015/0224733 | A1* | 8/2015 | Hagler | B31F 5/04 156/64 |
| 2016/0236438 | A1* | 8/2016 | Nitta | B31F 1/2881 |
| 2018/0244480 | A1* | 8/2018 | Hirasawa | B65G 47/91 |
| 2018/0345618 | A1* | 12/2018 | Mizutani | B31F 5/04 |
| 2022/0267108 | A1* | 8/2022 | Hoefnagels | B41J 11/0095 |

* cited by examiner

WARP DETECTION IN TRAVELING CORRUGATED PRODUCT

CROSS REFERENCE TO RELATED APPLICATION

This application is a continuation of U.S. patent application Ser. No. 18/367,558, filed Sep. 13, 2023, which claims the benefit of U.S. Provisional Patent Application Ser. No. 63/406,433, filed Sep. 14, 2022, the contents of which are incorporated herein in their entirety by reference.

TECHNICAL FIELD

The application relates generally to the production of corrugated board, and more particularly, to a corrugated board manufacturing system that uses a shape measurement and defect detection apparatus during the production of corrugated board.

BACKGROUND

The production of corrugated board products is well known. Briefly, in its simplest form a conventional corrugated board structure is made by gluing two flat sheets of web material (called 'liners') to the opposing flute crests of an intermediate, fluted or corrugated sheet of web material (called 'medium'). Often this is done by applying lines of glue, which can be an aqueous starch-based adhesive, to the flute crests of the corrugated sheet and then joining those glue-applied crests to the respective liner in a continuous process. First, a single-face construction is made by joining the first liner to the flute crests at one side of the corrugated sheet in a single-facer. Then the resulting single-face composite is delivered to a double-backer where the second liner is joined to the opposing flute crests to yield a three-layer corrugated board structure. The corrugated board structure is further cut by a rotary shear, transferred to a slitter scorer to perform slitting and creasing of the corrugated board, further cut to form pieces of corrugated board, and then the pieces are stacked. Such processes are well known, as described for example in U.S. Pat. No. 8,398,802, the contents of which are incorporated herein by reference.

The quality of the produced corrugated board product can be measured by determining flatness or the amount of warp. Whether a corrugated board product contains warp is dependent on many factors during the manufacturing process and subsequent storage. Factors can include, for example, paper supply, adhesive supply, machine tensioning and forces, moisture levels, heating steps, environmental and storage conditions. All of these variables affect the dimensional stability of the final board product on both the hygroexpansion and hydroexpansion levels.

Detection of warp is accomplished by systems that utilize cameras and lasers. The warp detection equipment is mounted well above cut or scored corrugated board product in a manufacturing system. Cut edges and scoring is detected by warp systems and must be both tracked and accounted for when determining warp and what adjustments should be made to the manufacturing system. This adds complexity to the warp calculations. When mounted above the corrugated board product, the warp detection system cannot see the printed surface facing downward thereby no quality assessments of the printing-side of the corrugated board can be achieved while measuring warp.

The corrugated board product also travels along conveyors and stationary surfaces during manufacturing and can be under tension and frictional forces from rollers and the stationary surfaces as the detection of warp is carried out. In addition to the tension and frictional forces that can pull a corrugated board product temporarily flat, the corrugated board product also tends to flatten under its own weight when not under tension as it travels on conveyors or is stacked at the end of a manufacturing process. Such additional forces, such as friction, tension and gravity, can alter the degree of warp that is detected and cause warp corrections to be imprecise. Friction, tension and gravity forces can hide warp that would otherwise be detectable and addressed by upstream adjustments to the manufacturing system. The undetected or hidden warp appears later downstream in the process and during storage of the corrugated board product and cannot be easily corrected post-manufacturing. This leads to waste and disposal of warped corrugated board product that increases the overall costs and time for producing quality corrugated board product.

The inventor has now discovered an efficient way to use a warp detection apparatus to analyze a truer version of a corrugated board product that is not under or significantly experiencing friction, tension, gravitational weight, or a combination thereof, thus making detection of and quantifying warp more accurate. The inventor's solutions disclosed herein also dispense with the drawbacks noted above that limit the position of warp detection equipment designed to be mounted above cut or scored corrugated board product. Not only are the current warp detection solutions complex by having to account for applied cuts and scoring, as well as attempting to compensate for other flattening forces, but they have exhibited problems with post-manufacturing outcomes of unwanted warped product.

SUMMARY

In accordance with one aspect of the present invention, an apparatus for producing a multi-layer product is disclosed. The apparatus includes a flotation column that is operable to support the multi-layer product at a variable height above the flotation column on a cushion of air. The apparatus further includes a warp detection apparatus that detects an amount of warp in the multi-layer product that is supported by the flotation column.

DETAILED DESCRIPTION

As used herein, when a range such as 5-25 or >5 up to 25 is given, this means preferably at least or more than 5 or preferably >5, and separately and independently, preferably not more or less than 25.

It has been determined that by suspending or floating a corrugated board product on a cushion or stream of air that one or more forces that conventionally act on the corrugated board product to mask, hide or alter the degree of warp can be significantly reduced and/or eliminated. For instance, tension and gravity forces can be minimized or eliminated by the flotation of a corrugated board product. The flotation of a corrugated board product can be combined with a warp detection apparatus that is used to detect an amount of warp of the corrugated board product as it travels along and is temporarily floated in a portion of a corrugated manufacturing process. The warp detection apparatus can be selectively positioned to monitor one or more surfaces of the corrugated board product that is suspended on the cushion of air to assess the amount of warp without having to account for other forces that would otherwise mask, hide or alter the degree of warp in the product.

Flotation of a corrugated board product in a corrugated manufacturing system is achieved by one or more flotation columns. A corrugated board product can be fed or transferred to move across an outer surface of the one or more flotation columns that have an opening or plurality of openings in the outer surface. An air source is used to supply a volumetric flow of air to the flotation columns which is then emitted from the outer surface of the flotation column through the openings to form a stream or cushion of pressurized air for supporting the corrugated board product traveling across the outer surface while floating on a cushion of air. Air, as used herein, can include any gas mixture and is not limited to a certain gaseous composition. The floating, air-supported corrugated board product can continue to travel and be exposed to a warp detection region that includes a warp detection apparatus for analyzing the floating product. The combination of the one or more flotation columns and warp detection apparatus can be positioned at one or more points along a corrugated manufacturing system. An example position is disclosed to briefly show how the combination can be utilized. The use of the combination is not limited to the example position or to only one location in a corrugated manufacturing system. Multiple combinations of flotation columns and warp detection apparatus can be used in a corrugated manufacturing system to closely monitor and analyze warp and for making adjustments in the manufacturing system to correct detected warp. To understand potential placement points for the combination, first a basic understanding of how paper webs are assembled will be helpful.

Figure 1:
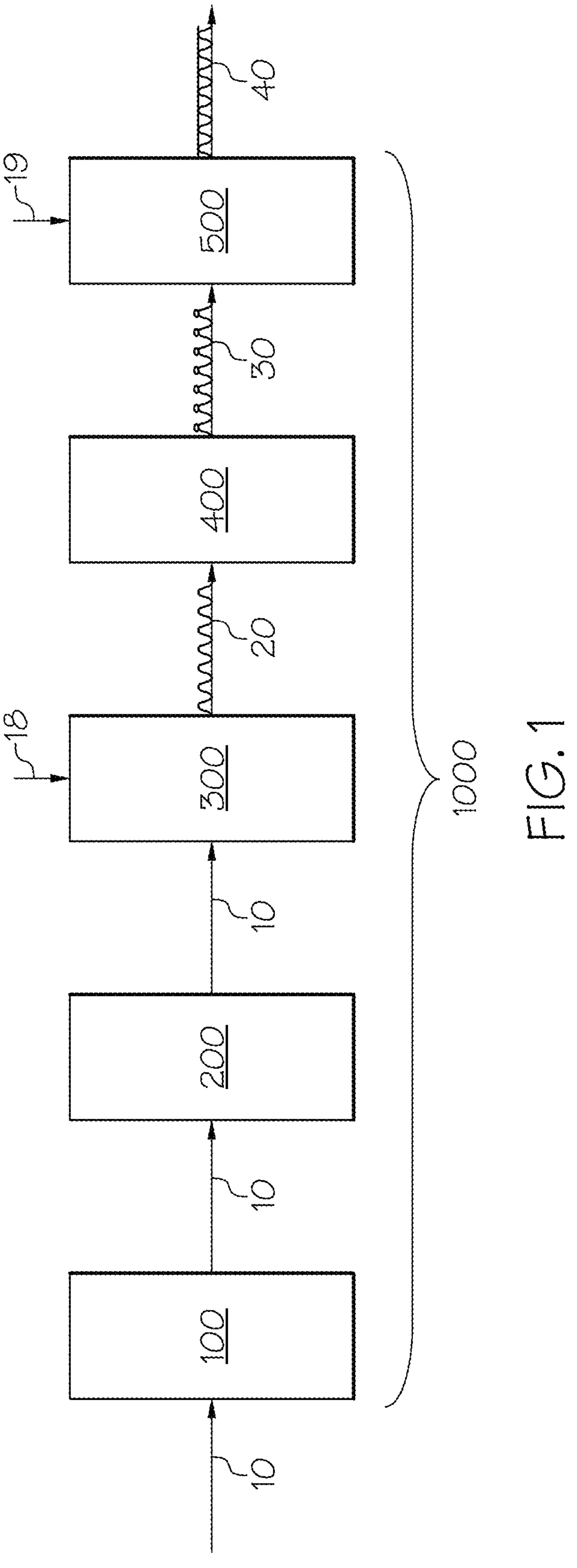
FIG. 1 is a top-level schematic block diagram illustrating example process steps and associated equipment for methods of making composite corrugated board.

An example corrugator setup will now be briefly described. A block diagram of an example corrugating apparatus 1000 is shown schematically in FIG. 1. In the illustrated embodiment, corrugating apparatus 1000 includes a moisture conditioning apparatus 100 (FIG. 2), a web heating arrangement 200, a single-facer 300, a glue machine 400, and a double-backer or double-facer 500. These components (100-500) are arranged in the illustrated and recited order relative to the machine direction of a web of medium material 10 as it travels along a machine path through corrugating apparatus 1000 to produce a finished corrugated board product 40 exiting double-backer 500. As will become apparent, the medium material 10 will become the corrugated web to which the opposing first and second face-sheet webs 18 and 19 will be adhered to produce the finished corrugated board product 40. The corrugator setup described and illustrated here with respect to FIG. 1 is substantially the same as that described in detail in U.S. Pat. No. 8,398,802 incorporated by reference above. The same setup having similar and alternative features and as described in the ’802 patent can be utilized in the methods disclosed herein. Specifically, the same moisture conditioning apparatus 100 (including a thin-film metering device 130) described in the ’802 patent (where it is used to condition paper webs to 6-9 wt. % total moisture) can be used to apply the excess of moisture to the bonding surfaces of the medium and liners (and web if desired) as described herein.

The first face-sheet web 18 in FIG. 1 will supply the first liner for the finished corrugated board product 40 on exiting the corrugator. Prior to applying the first face-sheet web 18 to the corrugated medium material 10 as in the conventional process (e.g. disclosed in the ’802 patent), it is conditioned to adjust its moisture content to achieve the combined effects described above of: protecting fiber-bound water to prevent over drying, reducing magnitude of hygroexpansivity, and stress-relieving the face-sheet web 18; all of which can be achieved via drying under restraint (i.e. under tension) against hot plates or heated rollers once the required excess-moisture layer has been applied.

The moisture adjustment can be achieved by applying a substantially continuous thin film of water to the first face-sheet 18 to adjust its overall moisture content to yield a substantial excess of moisture within the desired range as herein disclosed. The water layer can be applied to the side of the web 18 that will be down to (i.e., directly contact) a heat source prior to contacting flutes of the web of medium material 10, on which glue has been applied, for bonding thereto in the single-facer 300.

The resulting single-faced web 20 (composed of the web of medium material 10 adhered to the first-face sheet 18, preferably both of which by now have been moisture conditioned) exits the single-facer 300 and enters the glue machine 400 where glue is applied to the remaining exposed flute crests in order that the second face-sheet web 19 can be applied and adhered thereto in the double-backer 500.

The single-faced web 20, having glue applied to the exposed flute crests, enters the double-backer 500 where the second face-sheet web 19 is applied and adhered to the exposed flute crests and the resulting double-faced corrugated assembly is pressed together.

Prior to entering the double-backer 500, the second face-sheet web 19, which will supply the second liner to the finished corrugated board product 40, is conditioned similarly as the first face-sheet web 18 described above to apply a metered thin film of moisture to achieve a substantial excess moisture content. Preferably this layer of moisture is applied to the bonding surface of the second face-sheet web 19, which will be bonded to the exposed flute crests of the web of medium material 10 via glue or suitable adhesive.

Figure 2:
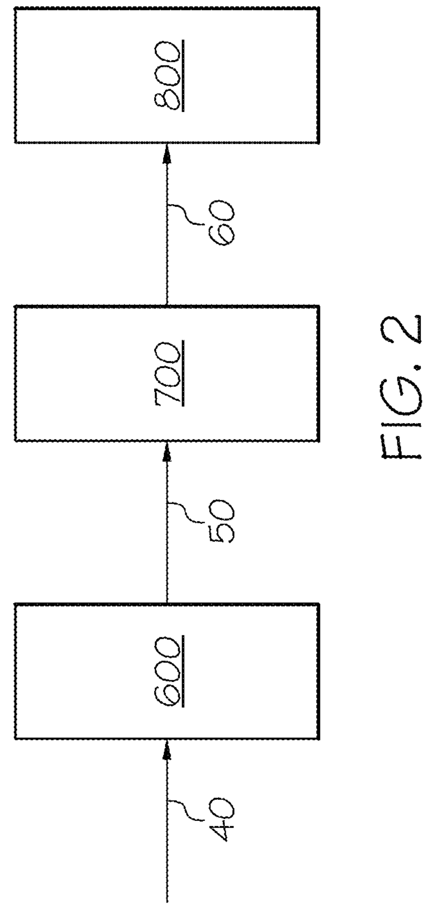
FIG. 2 is a top-level schematic block diagram illustrating example process steps and associated equipment for methods of making composite corrugated board.

The finished corrugated board product 40 can be further processed, for instance, as briefly shown in FIG. 2. Prior to downstream processing, finished corrugated board product 40 is a continuous formed sheet free of cuts, scoring and slits present in a stacked final product. Thus, finished corrugated board product 40 represents a product form, prior to downstream operations, that a warp detection apparatus can analyze without adjusting for product features that can appear as warp like scores, cuts, slits, etc. resulting from such downstream operations. Once finished corrugated board product 40 is further processed, warp detection can become more complex as various surface features and treatments must be appropriately accounted for to determine the accurate degree of warp in a corrugated board product.

From the double-backer 500, the corrugated board product 40 is transferred to a slitter scorer 600 to slit and/or score the finished corrugated board product 40 fabricated by the double-backer 500. The slit and/or scored corrugated board product 50 is moved through a cutter device 700 to produce corrugated product boards or sheets 60 at desired dimensions by cutting the corrugated board 50. The corrugated product boards or sheets 60 can be aggregated or shingled together and sequentially stacked by a stacker 800 in order of fabrication.

Figure 3:
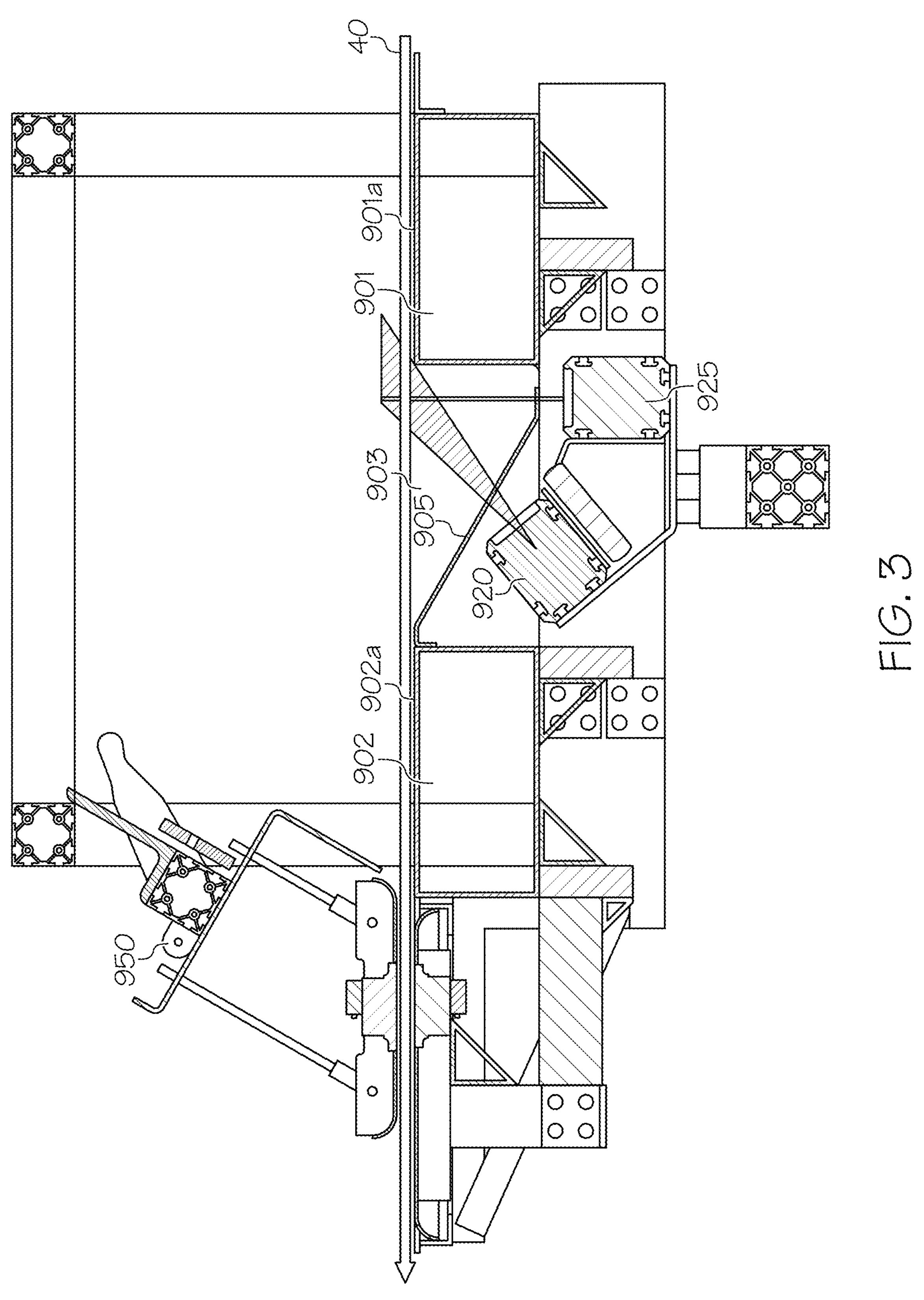
FIG. 3 is a side view of an example flotation column apparatus and warp detection apparatus that can be used in a corrugated board manufacturing system.

As noted above, the one or more flotation columns can be arranged at various points in the corrugated manufacturing system. FIG. 3 illustrates an example arrangement, in a cross-section view, of a first flotation column 901 spaced apart from a second flotation column 902. Flotation columns 901, 902 can be optionally secured together to provide structural integrity and ensure the columns are stationary, for example, by attaching a support bracket 905 to each column to prevent movement during operation. Flotation columns 901, 902 are shown as rectangular columns but any desirable column shape can be used such that an outer surface (e.g., flat plane) of the column is arranged to face corrugated board product 40 for supporting product 40 as it travels over and parallel to the outer surface of the one or more column.

As shown, corrugated product 40 is fed across the top outer surface 901*a* of flotation column 901 as indicated by the downstream travel direction arrow for product 40. Corrugated board product 40 travels across flotation column 901 and over an open area 903 before reaching the adjacent top outer surface 902*a* of flotation column 902. As shown, corrugated board product 40 is supported and suspended above the top outer surfaces 901*a*, 902*a* of flotation columns 901, 902, and likewise over open area 903 between the columns, on a stream or cushion or air emitted from the columns. The height of supported corrugated product 40 over the top outer surfaces 901*a*, 902*a* of columns 901, 902 can be varied, for example, in the range of 5 to 20 mm or any desired height, by adjusting air flow into and out of the columns. Corrugated board product 40 travels over both columns 901, 902 and open area 903 without contacting another solid surface thereby reducing additional forces (e.g., friction) that can act on and/or alter detectable warp in the product. The top outer surfaces of the columns can be described as a zero-contact surfaces since the corrugated board product is supported directly above and not in contact with such surfaces. It is not meant to imply that there can never be any contact between any flotation column surface and the corrugated board product. Contact may occur, for example, due to transient or momentary fluctuations during operation.

Figure 4:
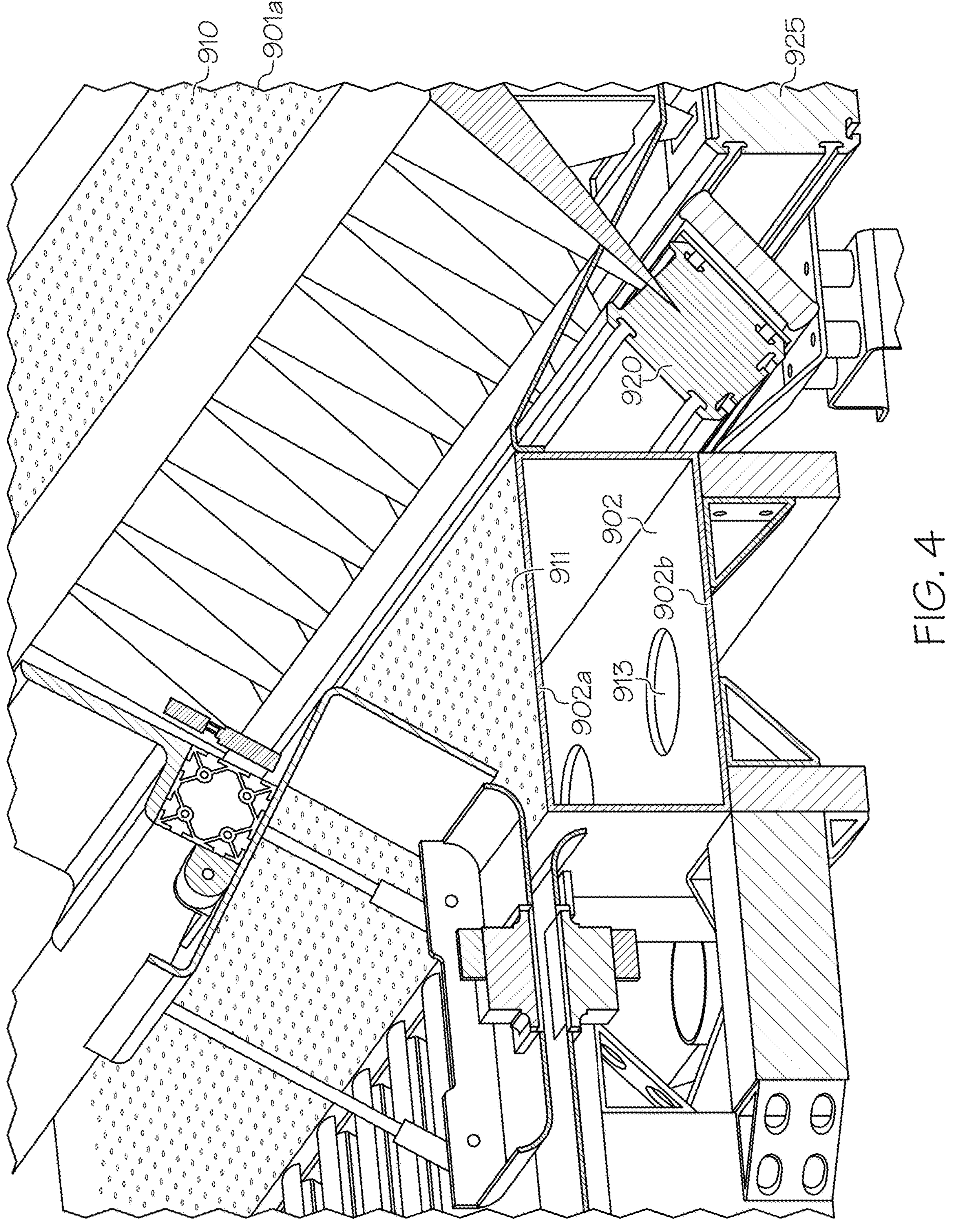
FIG. 4 is a perspective view of a portion of the flotation column apparatus and warp detection apparatus of FIG. 3.
Figure 5:
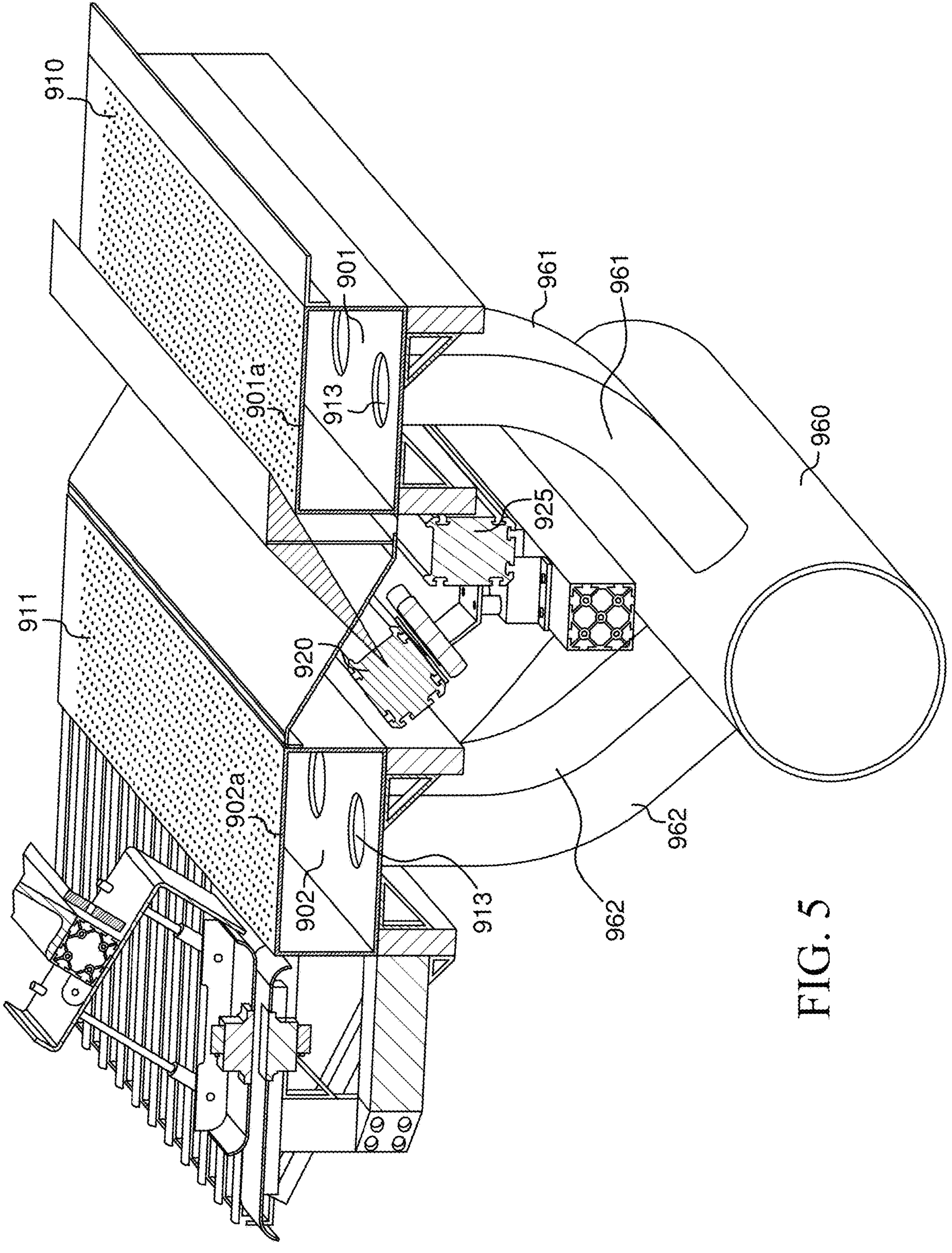
FIG. 5 is a cross-section view of a portion of the flotation column apparatus and warp detection apparatus of FIG. 3.

To support corrugated board product 40, columns 901, 902 are hollow for receiving a flow of air from a pressurized air source. FIG. 4 illustrates flotation column 902 having a hollow center portion with multiple openings 913 along the bottom outer surface 902*b* for receiving a volumetric flow of air from a pressurized air source. Columns 901, 902 can alternatively receive pressurized air from a single inlet into the column positioned at any suitable location (e.g., a bottom outer surface or column end surface). Air flows into flotation column 902 and is emitted out of the column through openings 911 in outer surface 902*a* of column 902. The volume or flowrate of pressurized air being fed to flotation column 902 can be varied depending on the desired flotation or support height of corrugated board product 40 above outer surface 902*a*. An air source preferably supplies compressed or pressurized air to columns 901, 902 and the pressurized air can be transferred to the columns as known in the art, for instance, by an air handling unit, pump, compressor or transfer blower. FIG. 5 shows an example air flow system for providing pressurized air to the flotation columns. A primary supply header 960 can be in fluid connection with a pressurized air supply. Primary supply header 960 is arranged to position a volumetric flow of pressurized air in proximity to flotation columns 901, 902. Header 960 can have one or more supply channels 961, 962 extending outward from the primary supply header to route or direct the pressurized air to inlet openings 913 to fill columns 901, 902 with pressurized air for floating product 40 on a constant stream of emitted air.

The top outer surfaces 901*a*, 902*a* of flotation columns 901, 902 can include one or more openings 910, 911 such as a plurality of openings for emitting air from inside the columns to form a cushion of flowing pressurized air above surfaces 901*a*, 902*a*. Openings 910, 911 can be arranged along the top outer surfaces to cover the entire area that corrugated board product 40 will travel over at the top outer surfaces. For example, corrugated board product traveling through a manufacturing system can have a width in the range of 2 to 3.5 meters and thus the flotation columns can include openings that span substantially all or the entire width of the traveling corrugated board product to ensure it is sufficiently supported on a cushion of air. As shown, a plurality of small openings 910, 911 are uniformly arranged in an array on the top outer surfaces 901*a*, 902*a* of the columns, although any pattern and size of openings can be used. Any number of openings can be used to support corrugated product 40 wherein the number of openings and air flowrate through the openings can be adjusted to achieve flotation of corrugated board product 40 above the top outer surfaces.

The flotation columns can be used with a warp detection apparatus. The warp detection apparatus is able to detect a degree of warp of a surface, for instance, whether the corrugated board product (e.g., continuous corrugated product, corrugated sheets in the cut, slit or scored form) are at least partially warped or non-warped along the length and/or width thereof as it travels on a cushion of air formed by the flotation columns. The warp detection apparatus components are known in the industry.

It is preferred that the warp detection apparatus is positioned at a distance away from the corrugated board product such that the warp detection apparatus is not in direct contact with the product. The warp detection apparatus detects and measures the distance from and/or profile of the air-suspended and traveling corrugated board product, preferably across the entire width and/or length thereof. In one example, the warp detection apparatus can be configured to include a laser distance detection or line profile detection device 925.

In another example, the warp detection apparatus can include an imaging device, either alone or in combination with a laser as shown in FIGS. 3-5. To detect the amount of surface variation or warping a corrugated board product the apparatus can include an imaging device for performing a scan of the product surface to provide imaging data so that image analysis can be carried out to analyze surface variation amounts based on collected imaging data from the imaging device. For instance, the imaging device can be a camera. Once an amount of surface variation is determined relative to the travel direction of the corrugated board product, the amount of warp can be calculated in said direction. The calculated amount of warp enables correction adjustments to be executed upstream, downstream, or a combination of both of the warp detection apparatus in the corrugated manufacturing system to prevent or reduce a degree of warp in future corrugated board product as compared to the analyzed product. Corrective warp measures or adjustments can be carried out by an operator without requiring time-consuming and costly manual inspection of corrugated board product. The warp detection apparatus can communicate with an information processing device or system that can change or correct one or more variables in the corrugated manufacturing system. Such variables can include, but are not limited to, a preheating or heating temperature of a roller, a face sheet, a web of material or corrugated product, a steam supply or temperature thereof, a water film amount applied to a face sheet or surface of a corrugated product, a glue amount, and the like.

Further surface and property data about the corrugated board product can be made at or near the point of warp detection by the warp detection apparatus. For example, a moisture sensor can be mounted directly upstream or downstream of the warp detection apparatus to convey the present moisture content of one or more layers of the corrugated board product in real time during manufacturing. The moisture data of the corrugated board product can be used to give an operator additional data for making warp adjustments to a corrugated product or individual component or surface thereof. As shown in FIG. 3, a moisture sensor 950 is positioned directly downstream of warp detection apparatus 920, 925 to determine moisture content of the layers of corrugated board product 40. The calculated moisture content will further assist an operator in determining, if applicable, the amount of moisture to apply to the corrugated board product or to a specific layer or surface of the product.

FIG. 3 illustrates an example arrangement of a warp detection apparatus relative to a traveling corrugated board product 40 supported on a cushion of air provided by flotation columns. As shown, camera 920 and laser 925 are mounted below the supported corrugated board product to analyze the bottom surface of the product facing the flotation columns. In an example arrangement, camera 920 and laser 925 positioned in between spaced-apart flotation columns 901, 902. Depending on the distance or open height between the top surface of flotation columns 901, 902 and first surface of corrugated board product 40 facing columns 901, 902, there may not be sufficient space to position components of the warp detection apparatus over the top surface of the columns. Rather, the open space 903 between columns 901, 902 forms a warp detection zone in which the warp detection apparatus components can evaluate the surface of floating or air-suspended corrugated board product 40 facing downward, for example, a bottom outer surface having printed indicia. The warp detection apparatus components 920, 925 can be mounted at any suitable distance from corrugated board product 40. The shown arrangement provides components 920, 925 to be mounted close to product 40 and can improve the accuracy of warp detection. In one example, the warp detection apparatus is mounted less than 1 meter, less than 0.5 meters, less than 0.2 meters or less than 0.1 meters from an outer surface of corrugated board product 40. In another example, the warp detection apparatus is mounted relative to the corrugated board product such that it is capable of detecting warp or surface variations in the corrugated board product of 100 μm or less, 50 μm or less, or 25 μm or less.

The warp detection apparatus components 920, 925 can be mounted on or around support bracket 905, or any alternative suitable support surface including a side surface of one or both of columns 901, 902. One or more openings or slots can be provided in support bracket 905 to accommodate camera views or lasers being generated below bracket 905 by components for targeting surfaces of corrugated board product 40. For example, FIG. 4 shows multiple through openings in support bracket 905 to permit camera 920 views and laser contact of the bottom surface of corrugated board product 40.

Although not shown, a warp detection apparatus can be mounted above the corrugated board product supported by emitted pressurized air from a flotation column (e.g., flotation columns 901, 902). Being mounted above supported corrugated board product 40, a warp detection apparatus need not be arranged between flotation columns 901, 902, but rather can be mounted over one of the columns or in any other suitable arrangement that can also include areas upstream and downstream of the columns and areas between the columns. In other examples, two or more warp detection apparatuses can be used to detect warp in a supported corrugated board product. A warp detection apparatus can be mounted above the supported corrugated board product supported by a flotation column while a separate warp detection apparatus can be mounted below the same corrugated board product as depicted in FIG. 3.

The one or more warp detection apparatuses can be positioned, along with the one or more flotation columns, at any point in a corrugated manufacturing system for determining the amount of warp in a corrugated board product. In one example, a warp detection apparatus is positioned upstream of a slitter, scorer or cutter and work in conjunction with one or more flotation columns to analyze warp of a corrugated board product supported on a cushion of air. The warp detection apparatus can also be positioned downstream of a double-facer as described in FIG. 1. In yet another example, one or more warp detection apparatuses can be positioned, either below, above or both relative to a corrugated board product, between a double-facer and a slitter or scorer.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. An apparatus for producing a multi-layer product, comprising:

a flotation column operable to support the multi-layer product at a variable height above the flotation column on a cushion of air; and a warp detection apparatus for detecting an amount of warp in the multi-layer product supported by the flotation column.

2. The apparatus of claim 1, wherein the flotation column is a first flotation column and the apparatus further comprises a second flotation column.

3. The apparatus of claim 2, wherein the first and second flotation columns are operable to support the multi-layer product at a variable height above respective outer surfaces of the first and second flotation columns on a cushion of pressurized air that is emitted from openings in the respective outer surfaces.

4. The apparatus of claim 3, wherein the respective outer surfaces of the first and second flotation columns are coplanar.

5. The apparatus of claim 2, wherein the warp detection apparatus is positioned between the first flotation column and the second flotation column in a travel direction of the multi-layer product.

6. The apparatus of claim 1, wherein the multi-layer product supported by the flotation column has opposite first and second surfaces, wherein the first surface faces the flotation column, and wherein the warp detection apparatus faces the first surface.

7. The apparatus of claim 1, wherein the multi-layer product supported by the flotation column has opposite first and second surfaces, wherein the first surface faces the flotation column, and wherein the warp detection apparatus faces the second surface.

8. The apparatus of claim 1, wherein the flotation column is a stationary column positioned adjacent the multi-layer product.

9. The apparatus of claim 1, wherein a distance between the multi-layer product and the flotation column is in a range of 5 mm to 50 mm.

10. The apparatus of claim 1, wherein the warp detection apparatus comprises an imaging device.

11. The apparatus of claim 1, wherein the warp detection apparatus comprises a laser.

12. The apparatus of claim 1, wherein the warp detection apparatus is capable of detecting warp in the multi-layer product of 100 μm or less.

13. The apparatus of claim 1, wherein the warp detection apparatus is arranged to detect the amount of warp in the multi-layer product when the multi-layer product is not in contact with a solid surface.

14. The apparatus of claim 1, wherein the warp detection apparatus comprises an imaging device and a laser device, and wherein the laser device emits a laser beam that intersects a field of view of the imaging device.

15. The apparatus of claim 1, further comprising a moisture sensor positioned downstream of the warp detection apparatus and configured to determine a moisture content of the multi-layer product.

16. The apparatus of claim 15, wherein the multi-layer product supported by the flotation column has opposite first and second surfaces, wherein the warp detection apparatus faces the first surface, and wherein the moisture sensor faces the second surface.

17. The apparatus of claim 16, wherein the first surface faces the flotation column.

18. The apparatus of claim 1, further comprising a bracket attached to the flotation column, wherein the bracket has an aperture formed therein, and wherein the warp detection apparatus has a field of view of a surface of the multi-layer product, through the aperture, in use.

19. The apparatus of claim 1, wherein the multi-layer product is an uncut, unscored double-faced corrugated board product.

20. The apparatus of claim 19, wherein the corrugated board product supported by the cushion of air is discharged from an upstream double facer prior to traveling over the flotation column arranged downstream of the double facer.

* * * * *